(12) United States Patent
Jia et al.

(10) Patent No.: US 12,491,190 B2
(45) Date of Patent: Dec. 9, 2025

(54) BILE ACID DERIVATIVE, COMPOSITION AND APPLICATION THEREOF

(71) Applicant: SHENZHEN YUNHE PHARMACEUTICAL TECHNOLOGY PARTNERSHIP (LIMITED), Guangdong (CN)

(72) Inventors: Wei Jia, Guangdong (CN); Guoxiang Xie, Guangdong (CN); Ning Zhai, Guangdong (CN); Aihua Zhao, Guangdong (CN); Xiaojiao Zheng, Guangdong (CN)

(73) Assignee: SHENZHEN YUNHE PHARMACEUTICAL TECHNOLOGY PARTNERSHIP (LIMITED), Shenzhen (CN)

( * ) Notice: Subject to any disclaimer, the term of this patent is extended or adjusted under 35 U.S.C. 154(b) by 955 days.

(21) Appl. No.: 17/637,450

(22) PCT Filed: Aug. 24, 2020

(86) PCT No.: PCT/CN2020/110851
§ 371 (c)(1),
(2) Date: Feb. 22, 2022

(87) PCT Pub. No.: WO2021/036998
PCT Pub. Date: Mar. 4, 2021

(65) Prior Publication Data
US 2022/0273675 A1    Sep. 1, 2022

(30) Foreign Application Priority Data

Aug. 23, 2019 (CN) .......................... 201910784166.X
Sep. 16, 2019 (CN) .......................... 201910875185.3

(51) Int. Cl.
*A61K 31/575* (2006.01)
*A61P 1/16* (2006.01)
*A61P 9/10* (2006.01)

(52) U.S. Cl.
CPC .............. *A61K 31/575* (2013.01); *A61P 1/16* (2018.01); *A61P 9/10* (2018.01)

(58) Field of Classification Search
None
See application file for complete search history.

(56) References Cited

U.S. PATENT DOCUMENTS

| 3,708,510 A | 1/1973 | Hannah et al. |
| 5,460,812 A | 10/1995 | Sipos |

FOREIGN PATENT DOCUMENTS

| AU | 2010286253 A1 | 4/2012 |
| CN | 102712672 A | 10/2012 |
| CN | 109364269 A | 2/2019 |
| IT | MI981079 A | 11/1999 |
| WO | 2003086303 A2 | 10/2003 |
| WO | 2007111994 A2 | 10/2007 |
| WO | 2010059853 A1 | 5/2010 |

OTHER PUBLICATIONS

Oct. 28, 2020 International Search Report issued in International Patent Application No. PCT/CN2020/110851.
Oct. 28, 2020 Written Opinion of the International Searching Authority issued in International Patent Application No. PCT/CN2020/110851.
Song, C. et al., Selective activation of liver X receptor alpha by 6α-hydroxy bile acids and analogs, Steroids, vol. 65, No. 8, Dec. 31, 2000 (Dec. 31, 2000), pp. 423-427, see fig. 1 and 4., Discussions.
Oct. 26, 2023 Extended European Search Report issued in European Patent Application No. 20856638.0.
Pellicciari et al., Bile Acid Derivatives as Ligands of the Farnesoid X Receptor. Synthesis, Evaluation, and Structure-Activity Relationship of a Series of Body and Side Chain Modified Analogues of Chenodeoxycholic Acid, Journal of Medicinal Chemistry, vol. 47 (18), pp. 4559-4569, 2004.
Fukuchi et al., 5β-Cholane activators of the farnesol X receptor, Journal of Steroid Biochemistry & Molecular Biology, vol. 94 (4), pp. 311-318, 2005.
Kimura et al., Synthesis, intestinal, absorption and metabolism of sarcosine conjugated ursodeoxycholic acid, Steroids, vol. 43 (6), pp. 677-687, 1984.
First Office Action issued in the counterpart Chinese application No. 201910875185.3 dated Nov. 30, 2022.
Barry M. Forman et al., Identification of a Nuclear Receptor That Is Activated by Farnesol Metabolites, Cell Press, Jun. 2, 1995, p. 687-693, vol. 81(5).
David J Mangelsdorf et al., The RXR Heterodimers and Orphan Receptors, Cell Press, Dec. 15, 1995, p. 841-850, vol. 83.
Derek J. Parks et al., Bile Acids: Natural Ligands for an Orphan Nuclear Receptor, Science, May 21, 1999, p. 1365-1368, vol. 284.
Jason A. Holt et al., Definition of a novel growth factor-dependent signal cascade for the suppression of bile acid biosynthesis, Cold Spring Harbor Laboratory Press, May 6, 2003, p. 1581-1591, vol. 17.
Takeshi Inagaki et al., Fibroblast growth factor 15 functions as an enterohepatic signal to regulate bile acid homeostasis, Cell Metabolism, Sep. 1, 2005, p. 217-225, vol. 2.

(Continued)

Primary Examiner — Brian J Davis

(57) ABSTRACT

Provided are a novel bile acid derivative for treating fatty liver disease, a pharmaceutical composition thereof, and a use in the preparation of a medicine for treating and improving diseases and symptoms mediated or caused by FXR or TGR5. The bile acid derivative of the present invention inhibits or delays the metabolism of bile acid by bacterial BSH/7α dehydroxylase in the intestine and greatly prolongs the effective survival time of bile acid in the intestine. The bile acid derivative and the pharmaceutical composition thereof can significantly stimulate bile acid membrane receptor TGR5, promote the secretion of glucagon-like peptide 1 from enteroendocrine cells, reduce liver fat accumulation, significantly improve liver function and increase glucose tolerance, thereby having an excellent effect on the treatment of fatty liver disease.

18 Claims, 10 Drawing Sheets

(56) References Cited

OTHER PUBLICATIONS

Yuji Kawamata et al., A G Protein-coupled Receptor Responsive to Bile Acids, The Journal of Biological Chemistry, Mar. 14, 2023, p. 9435-9440, vol. 278.

Shigeki Takeda et al., Identification of G protein-coupled receptor genes from the human genome sequence, Federation of European Biochemical Societies, May 8, 2002, p. 97-101, vol. 520.

Mitsuhiro Watanabe et al., Bile acids induce energy expenditure by promoting intracellular thyroid hormone activation, Nature, Jan. 26, 2006, p. 484-489, vol. 439.

Takaharu Maruyama et al., Targeted disruption of G protein-coupled bile acid receptor 1 (Gpbar1/M-Bar) in mice, Journal of Endocrinology, Aug. 1, 2006, p. 197-205, vol. 191.

Susumu Katsuma et al., Bile acids promote glucagon-like peptide-1 secretion through TGR5 in a murine enteroendocrine cell line STC-1, Biochemical and Biophysical Research Communications, Jan. 27, 2005, p. 386-390, vol. 329.

BILE ACID DERIVATIVE, COMPOSITION AND APPLICATION THEREOF

This application is a U.S. National Phase Application under 35 U.S.C. 371 of International Application No. PCT/CN2020/110851 filed on Aug. 24, 2020 and published in Chinese as WO 2021/036998A1 on Mar. 4, 2021.

TECHNICAL FIELD

The present disclosure pertains to the fields of medicine and biotechnology, and in particular pertains to a novel bile acid derivative, a preparation method thereof, a composition containing the derivative and application thereof.

BACKGROUND

Farnesoid X receptor (FXR) is an orphan nuclear receptor most closely related to the insect ecdysone receptor and originally identified from a rat liver cDNA library (BM. Forman et al., *Cell*, 1995, 81(5), 687-693). FXR is a member of the nuclear receptor family of ligand-activated transcription factors that includes receptors for steroids, retinoids, and thyroid hormones (DJ. Mangelsdorf et al., *Cell*, 1995, 83(6), 841-850). The physiological ligands of FXR are bile acids (D. Parks et al., *Science*, 1999, 284(5418), 1362-1365). The most effective one is chenodeoxycholic acid (CDCA), which regulates the expression of several genes involved in bile acid homeostasis. FXR is expressed in the liver and is distributed throughout the gastrointestinal tract, including the esophagus, stomach, duodenum, small intestine, colon, ovary, adrenal gland, and kidney. In addition to controlling intracellular gene expression, FXR appears to be involved in paracrine and endocrine signal transduction by upregulating the expression of the cytokine fibroblast growth factor (J. Holt et al., *Genes Dev.*, 2003, 17(13), 1581-1591; T Inagaki et al., *Cell Metab.*, 2005, 2(4), 217-225).

The TGR5 receptor is a G protein-coupled receptor that has been identified as a cell surface receptor that responds to bile acids (BA). The primary structure of TGR5 and its response to bile acids have been found to be highly conserved in TGR5 among human, bovine, rabbit, rat and mouse, thus suggesting that TGR5 has important physiological functions. TGR5 has been found to be widely distributed not only in lymphoid tissues but also in other tissues. High concentrations of TGR5 mRNA have been detected in placenta, spleen and monocytes/macrophages. Bile acids have been shown to induce the internalization of TGR5 fusion proteins from the cell membrane to the cytoplasm (Kawamata et al., *J. Bio. Chem.*, 2003, 278, 9435). TGR5 has been found to be identical to hGPCR19 reported by Takeda et al., *FEBS Lett.* 2002, 520, 97-101.

TGR5 is also associated with the intracellular accumulation of cAMP, which is widely expressed in various cell types. Activation of this membrane receptor in macrophages reduces the production of pro-inflammatory cytokine (Kawamata, Y et al., *J. Biol. Chem.* 2003, 278, 9435-9440), while stimulation of TGR5 by BA in adipocytes and monocytes increases energy expenditure (Watanabe, M et al. *Nature.* 2006, 439, 484-489). This latter effect involves the cAMP-dependent induction of type 2 iodothyronine deiodinase (D2), which leads to increased thyroid hormone activity by locally converting T4 to T3. Consistent with the role of TGR5 in the control of energy metabolism, female mice without TGR5 showed significant fat accumulation with weight gain when challenged with a high-fat diet, suggesting that TGR5 deficiency reduced energy expenditure and caused obesity (Maruyama, T, et al., *J. Endocrinol.* 2006, 191, 197-205). Additionally, and consistent with the involvement of TGR5 in energy homeostasis, bile acid activation of membrane receptors has also been reported to promote glucagon-like peptide 1 (GLP-1) production in murine enteroendocrine cell lines (Katsuma, S., *Biochem. Biophys. Res. Commun.*, 2005, 329, 386-390). Based on all these observations, TGR5 is a compelling target for the treatment of diseases such as obesity, diabetes and metabolic syndrome.

In addition to using TGR5 agonists to treat and prevent metabolic diseases, compounds that regulate TGR5 modulators can also be used to treat other diseases, such as central nervous system diseases and inflammatory diseases. TGR5 modulators also provide a way to regulate the dynamic balance of bile acids and cholesterol, the absorption of fatty acids, and the digestion of proteins and carbohydrates.

Among them, fatty liver refers to the pathological changes caused by excessive fat accumulation in liver cells due to various reasons, which is a common liver pathological change, rather than an independent disease. Fatty liver disease is seriously threatening the health of Chinese people, becoming the second largest liver disease after viral hepatitis, with an increasing incidence and younger onset age. Normal liver tissue contains a small amount of fat, such as triglyceride, phospholipid, glycolipid and cholesterol, and its weight is about 3% to 5% of liver weight. If there is too much fat accumulation in liver, which exceeds 5% of liver weight or more than 50% of liver cells have steatosis in histology, it can be called fatty liver. The clinical manifestations are asymptomatic in mild cases and severe in severe cases. Generally speaking, fatty liver is a reversible disease, which can often return to normal upon early diagnosis and timely treatment.

At present, treatment for this disease is also very limited. Clinical trials show that obecholic acid can significantly reduce the degree of liver fibrosis in patients with nonalcoholic fatty liver disease, but it has adverse effects on lipid metabolism, and the results of different clinical trials are inconsistent. Currently the drug is approved in the United States for primary biliary cirrhosis only. The guideline-recommended hepatoprotective drugs, such as silymarin, bicyclol, polyene phosphorylcholine, glycyrrhizic acid preparations, and reduced glutathione, do not have very definite evidence of their efficacy in nonalcoholic fatty liver disease. In addition, many drugs for the treatment of liver diseases can improve liver damage on the one hand, but on the other hand, the liver metabolism rate is very high, and the benefit/risk ratio is a question worthy of discussion. Therefore, there is a huge unmet need for safe and effective drugs for the treatment of nonalcoholic fatty liver disease.

Content of the Present Invention

The present disclosure provides a group of bile acid derivatives and a composition thereof, which can be used to modulate or ameliorate diseases and symptoms mediated or caused by FXR or TGR5.

The present disclosure provides a bile acid derivative represented by the following formula (I) or a stereoisomer, a salt or an ester thereof, Formula (I)

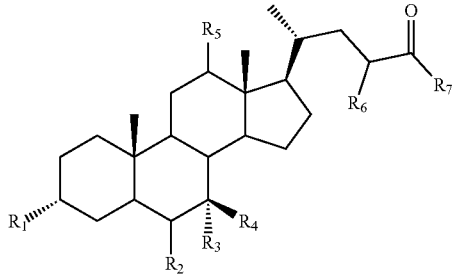

wherein,
$R_1$ is α-OH or β-O(CH$_2$)$_a$OH, wherein, a is 1-10,
$R_2$ is α-OH, H or CH$_2$OH,
$R_3$ is α-OH, H, β-OH or CH$_3$,
$R_4$ is H or CH$_3$,
$R_5$ is α-OH or H,
$R_6$ is H or (CH$_2$)$_b$CH$_3$, wherein, b is 0-3,
$R_7$ is

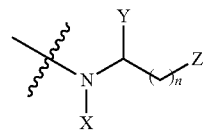

[X is H or CH$_3$, Y is CH$_3$ or CH$_2$OH, Z is COOH or SO$_3$H, n is 0-10; or $R_7$ is OH or —O(CH$_2$)$_t$CH$_3$, wherein, t is 0-3,
wherein, the carbon attached to $R_6$ methyl group can be S configuration or R configuration; in the $R_7$ substituent, the carbon attached to the Y group can be S configuration or R configuration.

The bile acid derivative of the present disclosure is further preferably that: $R_1$ is α-OH, $R_2$ is α-OH, $R_3$ is α-OH, $R_4$ is H, $R_5$ is α-OH or —H, $R_6$ is —H or (CH$_2$)$_b$CH$_3$ (b is 0-3), $R_7$ is

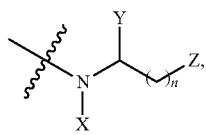

[X is H or CH$_3$, Y is CH$_3$ or CH$_2$OH, Z is COOH or SO$_3$H, n is 0-10] or OH or —O(CH$_2$)$_t$CH$_3$ (t is 0-3); wherein the carbon attached to $R_6$ methyl group can be S configuration or R configuration; in the $R_7$ substituent, the carbon attached to the Y group can be S configuration or R configuration.

The bile acid derivative of the present disclosure is further preferably that: $R_1$ is α-OH, $R_2$ is α-OH, $R_3$ is α-OH, $R_4$ is H, $R_5$ is H, $R_6$ is H or (CH$_2$)$_b$CH$_3$ (b is 0-3), $R_7$ is

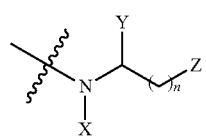

[X is H or CH$_3$, Y is CH$_3$ or CH$_2$OH, Z is COOH or SO$_3$H, n is 0-10], or $R_7$ is OH or —O(CH$_2$)$_t$CH$_3$ (t is 0-3); wherein the carbon attached to $R_6$ methyl group can be S configuration or R configuration; in the $R_7$ substituent, the carbon attached to the Y group can be S configuration or R configuration.

The bile acid derivative of the present disclosure is further preferably that: $R_1$ is α-OH, $R_2$ is α-OH, $R_3$ is α-OH, $R_4$ is H, $R_5$ is H, $R_6$ is H, $R_7$ is

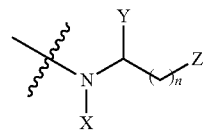

[X is H or CH$_3$, Y is CH$_3$ or CH$_2$OH, Z is COOH or SO$_3$H, n is 0-10] or $R_7$ is OH or —O(CH$_2$)$_t$CH$_3$ (t is 0-3); the carbon attached to the Y group can be S configuration or R configuration.

The bile acid derivative of the present disclosure is further preferably that: $R_1$ is α-OH, $R_2$ is α-OH, $R_3$ is -α-OH, $R_4$ is H, $R_5$ is H, $R_6$ is (CH$_2$)$_b$CH$_3$ (b is 0-3), $R_7$ is

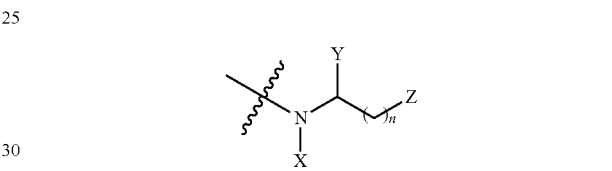

[X is H or CH$_3$, Y is CH$_3$ or CH$_2$OH, Z is COOH or SO$_3$H, n is 0-10] or $R_7$ is OH or —O(CH$_2$)$_t$CH$_3$ (t is 0-3); wherein the carbon attached to $R_6$ methyl group can be S configuration or R configuration; in the $R_7$ substituent, the carbon attached to the Y group can be S configuration or R configuration.

The bile acid derivative of the present disclosure is further preferably that: $R_1$ is α-OH, $R_2$ is α-OH, $R_3$ is α-OH, $R_4$ is H, $R_5$ is H, $R_6$ is H, $R_7$ is OH or —O(CH$_2$)$_t$CH$_3$ (t is 0-3).

The bile acid derivative of the present disclosure is further preferably that: $R_1$ is α-OH, $R_2$ is α-OH, $R_3$ is α-OH, $R_4$ is H, $R_5$ is H, $R_6$ is H, $R_7$ is OH.

The bile acid derivative of the present disclosure is further preferably that: $R_1$ is α-OH, $R_2$ is α-OH, $R_3$ is α-OH, $R_4$ is H, $R_5$ is H, $R_6$ is H, $R_7$ is —O(CH$_2$)$_t$CH$_3$ (t is 0-3).

The bile acid derivative of the present disclosure is further preferably that: $R_1$ is α-OH, $R_2$ is α-OH, $R_3$ is α-OH, $R_4$ is H, $R_5$ is H, $R_6$ is H, $R_7$ is

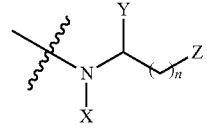

[X is H, Y is CH$_2$OH, Z is COOH, n is 0-10]; the carbon attached to the Y group can be S configuration or R configuration.

The bile acid derivative of the present disclosure is further preferably that: $R_1$ is α-OH, $R_2$ is α-OH, $R_3$ is α-OH, $R_4$ is H, $R_5$ is H, $R_6$ is H, $R_7$

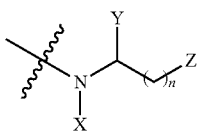

[X is H, Y is CH$_3$, Z is SO$_3$H, n is 0-10], the carbon attached to the Y group can be S configuration or R configuration.

The bile acid derivative of the present disclosure is further preferably that: R$_1$ is α-OH, R$_2$ is α-OH, R$_3$ is α-OH, R$_4$ is H, R$_5$ is H, R$_6$ is H, R$_7$ is

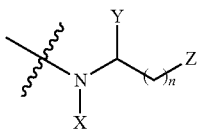

[X is H, Y is CH$_2$OH, Z is SO$_3$H, n is 0-10], the carbon attached to the Y group can be S configuration or R configuration.

The bile acid derivative of the present disclosure is further preferably that: R$_1$ is α-OH, R$_2$ is α-OH, R$_3$ is α-OH, R$_4$ is H, R$_5$ is H, R$_6$ is H, R$_7$ is

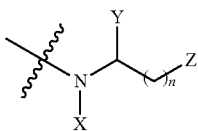

[X is H, Y is CH$_3$, Z is COOH, n is 0-10], the carbon attached to the Y group can be S configuration or R configuration.

The bile acid derivative of the present disclosure is further preferably that: R$_1$ is α-OH, R$_2$ is α-OH, R$_3$ is α-OH, R$_4$ is H, R$_5$ is α-OH or H, R$_6$ is —(CH$_2$)$_b$CH$_3$ (b is 0-3), R$_7$ is

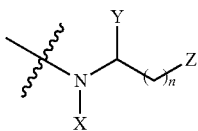

[X is H, Y is CH$_2$OH, Z is COOH, n is 0-10]; wherein the carbon attached to R$_6$ methyl group can be S configuration or R configuration; in the R$_7$ substituent, the carbon attached to the Y group can be S configuration or R configuration.

The bile acid derivative of the present disclosure is further preferably that: R$_1$ is α-OH, R$_2$ is α-OH, R$_3$ is α-OH, R$_4$ is H, R$_5$ is α-OH or H, R$_6$ is —(CH$_2$)$_b$CH$_3$ (b is 0-3), R$_7$ is

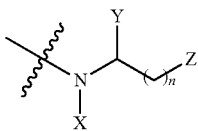

[X is H, Y is CH$_3$, Z is SO$_3$H, n is 0-10]; wherein the carbon attached to R$_6$ methyl group can be S configuration or R configuration; in the R$_7$ substituent, the carbon attached to the Y group can be S configuration or R configuration.

The bile acid derivative of the present disclosure is further preferably that: R$_1$ is α-OH, R$_2$ is α-OH, R$_3$ is α-OH, R$_4$ is H, R$_5$ is α-OH or H, R$_6$ is —(CH$_2$)$_b$CH$_3$ (b is 0-3), R$_7$ is

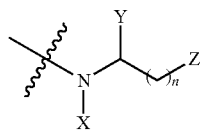

[X is H, Y is CH$_2$OH, Z is SO$_3$H, n is 0-10]; wherein the carbon attached to R$_6$ methyl group can be S configuration or R configuration; in the R$_7$ substituent, the carbon attached to the Y group can be S configuration or R configuration.

The bile acid derivative of the present disclosure is further preferably that: R$_1$ is α-OH, R$_2$ is α-OH, R$_3$ is α-OH, R$_4$ is H, R$_5$ is α-OH or H, R$_6$ is —(CH$_2$)$_b$CH$_3$ (b is 0-3), R$_7$ is

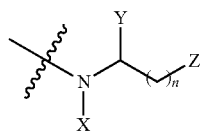

[X is H, Y is CH$_3$, Z is COOH, n is 0-10]; wherein the carbon attached to R$_6$ methyl group can be S configuration or R configuration; in the R$_7$ substituent, the carbon attached to the Y group can be S configuration or R configuration.

The bile acid derivative of the present disclosure is further preferably that: R$_1$ is α-OH, R$_2$ is α-OH, R$_3$ is α-OH, R$_4$ is H, R$_5$ is H, R$_6$ is H, R$_7$ is

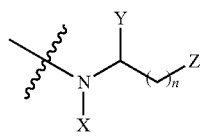

[X is CH$_3$, Y is CH$_2$OH, Z is COOH, n is 0-10], the carbon attached to the Y group can be S configuration or R configuration.

The bile acid derivative of the present disclosure is further preferably that: R$_1$ is α-OH, R$_2$ is α-OH, R$_3$ is α-OH, R$_4$ is H, R$_5$ is H, R$_6$ is H, R$_7$ is

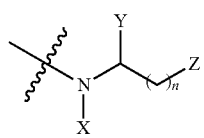

[X is CH$_3$, Y is CH$_3$, Z is SO$_3$H, n is 0-10], the carbon attached to the Y group can be S configuration or R configuration.

The bile acid derivative of the present disclosure is further preferably that: R$_1$ is α-OH, R$_2$ is α-OH, R$_3$ is α-OH, R$_4$ is H, R$_5$ is H, R$_6$ is H, R$_7$ is

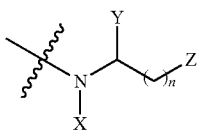

[X is $CH_3$, Y is $CH_2OH$, Z is $SO_3H$, n is 0-10], the carbon attached to the Y group can be S configuration or R configuration.

The bile acid derivative of the present disclosure is further preferably that: $R_1$ is α-OH, $R_2$ is α-OH, $R_3$ is α-OH, $R_4$ is H, $R_5$ is H, $R_6$ is H, $R_7$ is

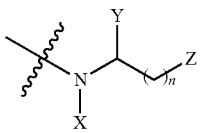

[X is $CH_3$, Y is $CH_3$, Z is COOH, n is 0-10], the carbon attached to the Y group can be S configuration or R configuration.

The bile acid derivative of the present disclosure is further preferably that: $R_1$ is α-OH, $R_2$ is α-OH, $R_3$ is α-OH, $R_4$ is H, $R_5$ is α-OH or H, $R_6$ is —$(CH_2)_bCH_3$ (b is 0-3), $R_7$ is

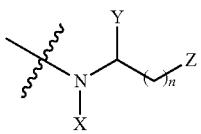

[X is $CH_3$, Y is $CH_2OH$, Z is COOH, n is 0-10]; wherein the carbon attached to $R_6$ methyl group can be S configuration or R configuration; in the $R_7$ substituent, the carbon attached to the Y group can be S configuration or R configuration.

The bile acid derivative of the present disclosure is further preferably that: $R_1$ is α-OH, $R_2$ is α-OH, $R_3$ is α-OH, $R_4$ is H, $R_5$ is α-OH or H, $R_6$ is —$(CH_2)_bCH_3$ (b is 0-3), $R_7$ is

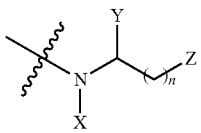

[X is $CH_3$, Y is $CH_3$, Z is $SO_3H$, n is 0-10]; wherein the carbon attached to $R_6$ methyl group can be S configuration or R configuration; in the $R_7$ substituent, the carbon attached to the Y group can be S configuration or R configuration.

The bile acid derivative of the present disclosure is further preferably that: $R_1$ is α-OH, $R_2$ is α-OH, $R_3$ is α-OH, $R_4$ is H, $R_5$ is α-OH or H, $R_6$ is —$(CH_2)_bCH_3$ (b is 0-3), $R_7$ is

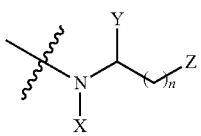

[X is $CH_3$, Y is $CH_2OH$, Z is $SO_3H$, n is 0-10]; wherein the carbon attached to $R_6$ methyl group can be S configuration or R configuration; in the $R_7$ substituent, the carbon attached to the Y group can be S configuration or R configuration.

The bile acid derivative of the present disclosure is further preferably that: $R_1$ is α-OH, $R_2$ is α-OH, $R_3$ is α-OH, $R_4$ is H, $R_5$ is α-OH or H, $R_6$ is —$(CH_2)_bCH_3$ (b is 0-3), $R_7$ is

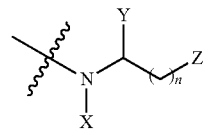

[X is $CH_3$, Y is $CH_3$, Z is COOH, n is 0-10]; wherein the carbon attached to $R_6$ methyl group can be S configuration or R configuration; in the $R_7$ substituent, the carbon attached to the Y group can be S configuration or R configuration.

An Embodiment of the bile acid derivative of the present disclosure is, as the basic structure of the said formula (I), wherein, $R_1$ is α-OH, $R_2$ is α-OH, $R_3$ is α-OH, $R_4$ is H, $R_7$ is

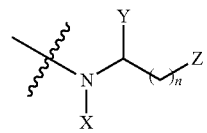

[X is H or $CH_3$, Y is $CH_3$ or $CH_2OH$, Z is COOH or $SO_3H$, n is 0-10], or $R_7$ is OH or —$O(CH_2)_tCH_3$ (t is 0-3), the carbon attached to the Y group can be S configuration or R configuration.

As one of the embodiments, $R_7$ is

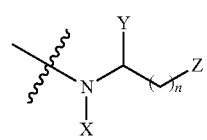

[X is H or $CH_3$, Y is $CH_3$ or $CH_2OH$, Z is COOH or $SO_3H$, n is 0-10], and the carbon attached to the Y group can be S configuration or R configuration; upon this structure, $R_6$ can further be —$(CH_2)_bCH_3$ (b is 0-3) or H; upon said structure, $R_5$ can further be H or α-OH.

As one of the embodiments, $R_7$ is OH or —$O(CH_2)_tCH_3$ (t is 0-3), on the basis of this structure, $R_6$ is —$(CH_2)_bCH_3$ (b is 0-3) or H; upon said structure, $R_5$ can further be H or α-OH.

The present disclosure further provides a composition comprising any one of or more than one bile acid derivatives described above, and an acceptable carrier.

The present disclosure further provides a composition for use in the treatment and amelioration of diseases and symptoms mediated or caused by FXR or TGR5, comprising an effective amount of any one of or more than one bile acid derivatives as described above and an acceptable carrier.

The effective amount refers to a daily dose of the composition comprising any one of or more than one bile acid derivatives as described above at 50-500 mg/kg of a patient's body weight.

The acceptable carrier refers to a pharmaceutically acceptable excipient.

The composition is an oral preparation, preferably an ordinary tablet, chewable tablet, dispersible tablet, granule, solution, capsule or suspension, more preferably an enteric-coated preparation or an enteric-coated sustained-release preparation.

The present disclosure further provides a use of any one of the bile acid derivatives as described above in the manufacture of a composition for the treatment and amelioration of diseases and symptoms mediated or caused by FXR or TGR5.

The present disclosure further provides any one of the bile acid derivatives as described above for use in the treatment and amelioration of diseases and symptoms related to liver injury mediated or caused by FXR or TGR5.

Further preferably, in the above use, the bile acid derivatives can be optionally used in combination with conventional hypoglycemic and lipid-lowering drugs. The conventional hypoglycemic and lipid-lowering drugs are selected from Liraglutide, Exenatide and Albiglutide.

In the above use, an effective amount of the bile acid derivative refers to any one of or more than one bile acid derivatives described above at 50-500 mg/kg of a patient's body weight.

The terms used in the present disclosure are described below:

The diseases or symptoms mediated or caused by the FXR or TGR5 include the following diseases or symptoms: liver disease, hyperlipidemia, hypercholesterolemia, obesity, metabolic syndrome, cardiovascular disease, gastrointestinal disease, atherosclerosis sclerosis and nephropathy. The diseases and symptoms related to liver injury mediated or caused by the FXR or TGR5 include the following diseases or symptoms: simple fatty liver, primary biliary cirrhosis, primary sclerosing cholangitis, liver fibrosis, liver cirrhosis, non-alcoholic steatohepatitis, non-alcoholic fatty liver disease and their associated liver injuries, further particularly refer to simple fatty liver, non-alcoholic steatohepatitis and their associated liver injuries.

The compounds described in the present disclosure include pharmaceutically acceptable acid or base addition salts and esters thereof. When the compounds of the present disclosure have basic groups, pharmaceutically acceptable salts can be formed from inorganic acids, organic acids or acidic amino acids. When the compounds of the present disclosure have acidic groups, they can form salts with metals, ammonia or organic amines or basic amino acids.

The compounds of the present disclosure can exhibit tautomerism, configurational isomerism, geometric isomerism and stereoisomerism. Although the present disclosure only presents limited isomeric forms, the compounds of the present disclosure should encompass any tautomeric, configurational, stereochemical or geometrically isomeric configurations of one or more compounds having the effects described herein, as well as mixtures of these different forms.

The combinations recited herein encompass any and all possible subranges and combinations of subranges. In particular, by way of example, a group of 1-3 atoms refers to a group having 1, 2 or 3 atoms. A group of 0 to 3 atoms refers to further including a situation where the group is absent beyond the above-mentioned range.

The acceptable carrier contained in the composition of the present disclosure refers to a pharmaceutically acceptable carrier or excipient or filler or diluent or other necessary excipients according to the knowledge of those skilled in the pharmaceutical field. The composition comprises a therapeutically effective amount of one or more than one bile acid derivatives of the present disclosure. The composition can be administered in a variety of ways, such as injection, oral administration, inhalation, implantation, and the like.

The bile acid derivatives of the present disclosure can be prepared according to the knowledge of those skilled in the art with the guidance of the preparation methods in the Examples.

DETAILED DESCRIPTION OF THE PREFERRED EMBODIMENT

Figure 1:
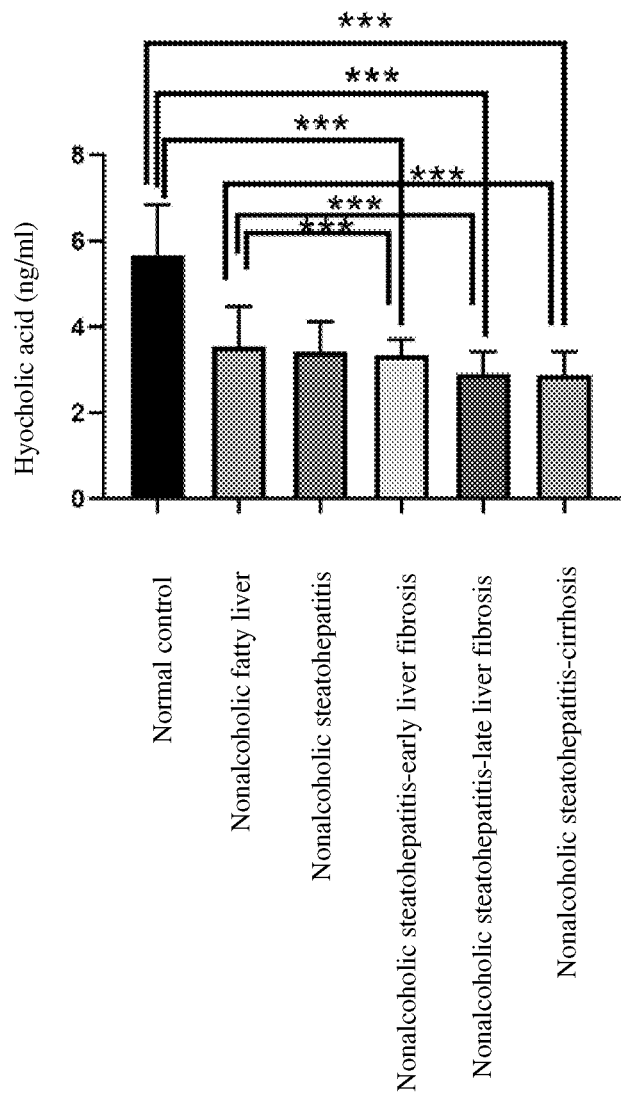
FIG. 1 is a graph of the average hyocholic acid content of normal people, patients with nonalcoholic fatty liver disease, patients with nonalcoholic steatohepatitis, patients with non-alcoholic steatohepatitis-early stage liver fibrosis, patients with nonalcoholic steatohepatitis-late stage liver fibrosis and patients with nonalcoholic steatohepatitis-cirrhosis in the present disclosure.

In order to make the purpose, technical solutions and effects of the present disclosure become clearer and definite, the present disclosure will be further illustrated in detail below with reference to the drawings and examples. It should be understood that the specific examples described herein are only used to explain the present disclosure, but not to limit the present disclosure.

All reagents and materials in the preparation examples were purchased from commercial suppliers.

The codes and structural formulas of the compounds used in the examples are shown in the following table.

TABLE 1

Structure of synthesized hyocholic acid derivatives

| Code name | Chemical name | Structural formula |
|---|---|---|
| ZN-1-34-1 | D-Alanine hyocholic acid | |
| ZN-1-28-1 | L-Alanine hyocholic acid | |
| ZN-1-78-1 | L-Serine hyocholic acid | |
| ZN-1-93-1 | N-methylglycine hyocholic acid | |
| ZN-1-102-1 | (S)-23-methyl hyocholic acid | |

TABLE 1-continued

Structure of synthesized hyocholic acid derivatives

| Code name | Chemical name |
|---|---|
| ZN-1-80-1 | D-Serine hyocholic acid |
| ZN-1-65-1 | (2R)-2-((4R)-4-((3R,6R,7S,10R,13R,17R)-3,6,7-trihydroxy-10,13-dimethylhexadecahydro-1H-cyclopenta[a]phenanthren-17-yl)pentamido)propane-1-sulfonic acid |
| ZN-1-71-1 | (2S)-2-((4R)-4-((3R,6R,7S,10R,13R,17R)-3,6,7-trihydroxy-10,13-dimethylhexadecahydro-1H-cyclopenta[a]phenanthren-17-yl)pentamido)propane-1-sulfonic acid |
| ZN-1-86-1 | N-methyltauro hyocholic acid |

Example 1: Synthesis of D-alanine hyocholic acid

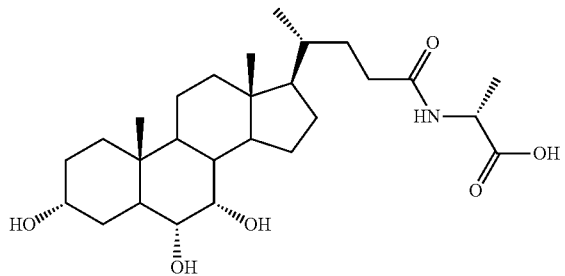 [SMILES: C[C@H](CCC(=O)N[C@H](C)C(=O)O)[C@H]1CCC2C3C(CC[C@@]21C)[C@@]1(C)CC[C@@H](O)CC1[C@@H](O)[C@H]3O]

The preparation method includes the following steps:

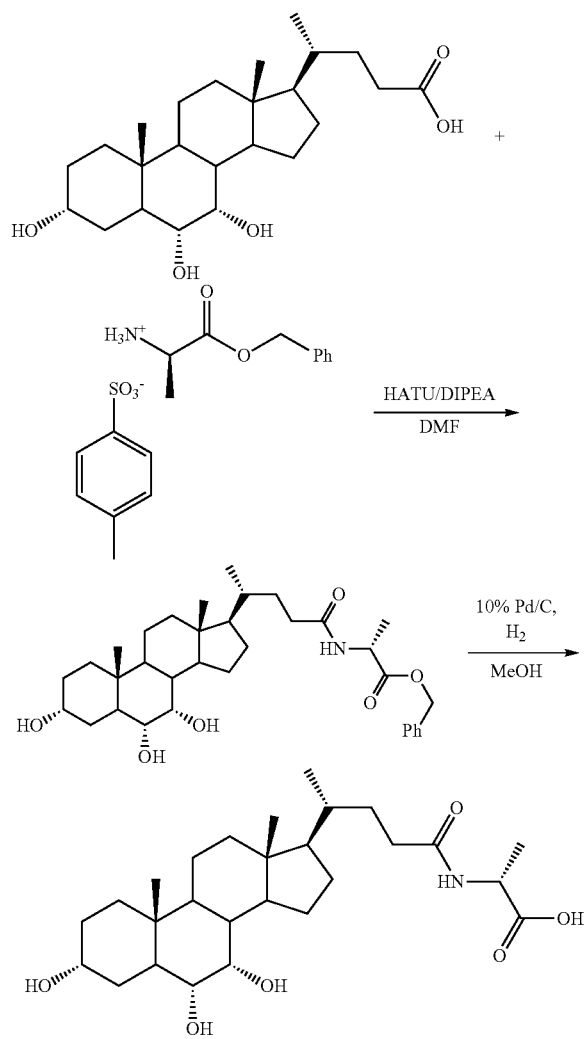

Hyocholic acid (0.204 g, 0.5 mmol), D-phenylalanine benzyl ester p-toluenesulfonate (0.185 g, 0.52 mmol) and N,N-diisopropylethylamine (0.194 mg, 1.5 mmol)) were dissolved in dimethylformamide (5 ml) and stirred evenly. At room temperature, tetramethylurea hexafluorophosphate (0.209 g, 0.55 mmol) was added to the reaction solution at one time, and the reaction was carried out at this temperature for 1 h. After the completion of the reaction monitored by thin layer chromatography, water (10 ml) was added and the reaction solution was extracted twice with ethyl acetate. The organic phase was washed with 1N sodium hydroxide, 1N hydrochloric acid and saturated brine successively, and then the organic phase was dried and concentrated to obtain D-alanine hyocholic acid benzyl ester.

The obtained intermediate was dissolved in methanol (10 mL), and subjected to the catalytic hydrogenation in the presence of 25 mg 10% palladium carbon at room temperature. After the reaction, Pd/C was removed by filtration, and the filtrate was concentrated under reduced pressure to obtain the crude product of D-propylamine hyocholic acid. D-propylamine hyocholic acid (0.216 g) was obtained by purification by column chromatography, and the yield of two steps was 90%. ESI-MS (m/z): 959.6 (2M+H)$^+$. $^1$HNMR (300 MHz, DMSO): δ0.6 (s, 3H), 0.83 (s, 3H), 0.88 (d, 3H), 1.23 (d, 3H), 3.13 (m, 1H), 3.59 (m, 2H), 3.89 (s, 1H), 4.14 (t, 1H), 8.01 (d, 1H).

Example 2: Synthesis of L-alanine hyocholic acid

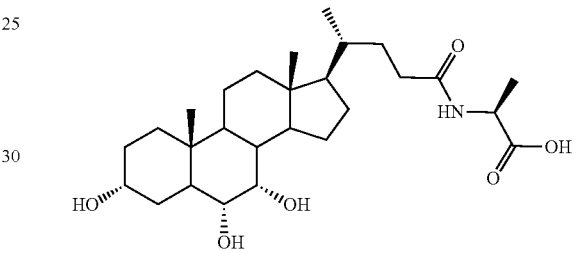

The procedure was the same as that in Example 1, except that D-alanine benzyl ester p-toluenesulfonate was replaced with L-alanine benzyl ester hydrochloride to obtain L-alanine hyocholic acid (0.164 g) with a yield of 86.2%. ESI-MS (m/z): 959.6 (2M+H)$^+$. $^1$HNMR (300 MHz, DMSO): δ0.6 (s, 3H), 0.83 (s, 3H), 0.88 (d, 3H), 1.23 (d, 3H), 3.13 (m, 1H), 3.59 (m, 2H), 3.89 (s, 1H), 4.14 (t, 3H), 4.19 (m, 1H), 4.32 (m, 1H), 8.06 (d, 1H).

Example 3: Synthesis of L-serine hyocholic acid

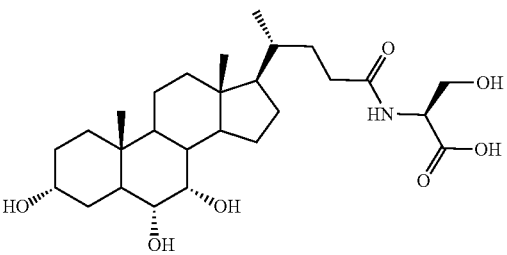 [SMILES: C[C@H](CCC(=O)N[C@@H](CO)C(=O)O)[C@H]1CCC2C3C(CC[C@@]21C)[C@@]1(C)CC[C@@H](O)CC1[C@@H](O)[C@H]3O]

The procedure was the same as that of Example 1, except that D-alanine benzyl ester p-toluenesulfonate was replaced with L-serine benzyl ester hydrochloride to obtain L-serine hyocholic acid (0.352 g) with a yield of 93.6%. ESI-MS (m/z): 991.6 (2M+H)$^+$. $^1$HNMR (300 MHz, DMSO): δ0.6 (s, 3H), 0.83 (s, 3H), 0.88 (d, 3H), 3.13 (m, 2H), 3.59 (m, 4H), 3.89 (s, 1H), 4.20-4.28 (m, 2H), 4.19 (m, 1H), 4.32 (m, 1H), 8.06 (d, 1H).

Example 4: Synthesis of D-serine hyocholic acid

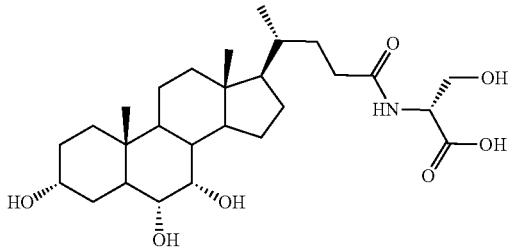

The procedure was the same as that of Example 1, except that D-alanine benzyl ester p-toluenesulfonate was replaced with D-serine benzyl ester hydrochloride to obtain D-serine hyocholic acid (0.334 g) with a yield of 89.2%. ESI-MS (m/z): 991.6 (2M+H)$^+$. $^1$HNMR (300 MHz, DMSO): δ0.6 (s, 3H), 0.83 (s, 3H), 0.88 (d, 3H), 3.13 (m, 2H), 3.59 (m, 4H), 3.89 (s, 1H), 4.20-4.28 (m, 2H), 4.19 (m, 1H), 4.32 (m, 1H), 8.06 (d, 1H).

Example 5: ((2R)-2-((4R)-4-((3R,6R,7S,10R,13R,17R)-3,6,7-trihydroxy-10,13-dimethylhexadecahydro-1H-cyclopenta[a]phenanthren-17-yl)pentanamido) propane-1-sulfonic acid)

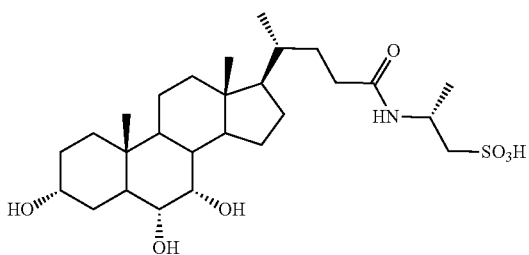 [SMILES: C[C@H](CS(=O)(=O)O)NC(=O)CC[C@@H](C)[C@H]1CCC2C3C(CC[C@@]21C)[C@@]1(C)CC[C@@H](O)CC1[C@@H](O)[C@H]3O]

The preparation method includes the following steps:

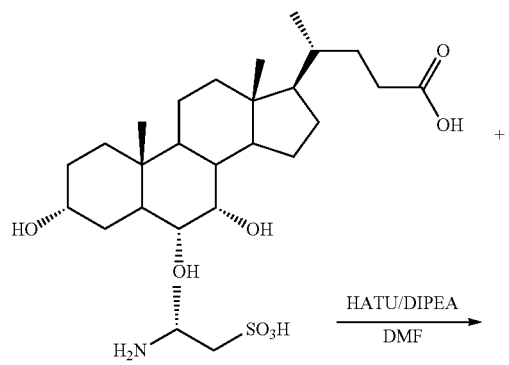

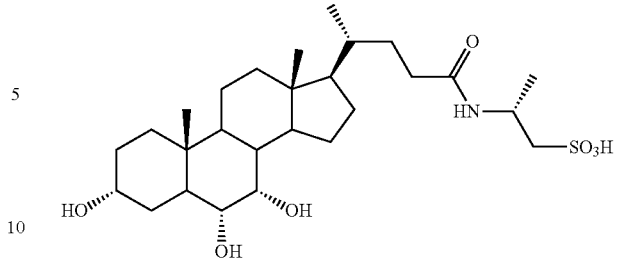

Hyocholic acid (0.31 g, 0.76 mmol), (R)-2-aminopropanesulfonic acid (0.1 g, 0.77 mmol) and N,N-diisopropylethylamine (0.29 mg, 2.28 mmol) were dissolved in dimethylformamide (5 ml) and stirred evenly. At room temperature, tetramethylurea hexafluorophosphate (0.32 g, 0.84 mmol) was added to the reaction solution at one time, and the reaction was carried out at this temperature for 1 h. After the completion of the reaction monitored by thin-layer chromatography, the reaction solution was concentrated to remove dimethylformamide, then water (10 ml) was added, and the reaction solution was extracted twice with ethyl acetate. The pH value of the water phase was adjusted to 1-2 with 1N hydrochloric acid, and then the water phase was concentrated to dry to obtain the crude product. (2R)-2-((4R)-4-((3R,6R,7S,10R,13R,17R)-3,6,7-trihydroxy-10,13-dimethylhexadecahydro-1H-cyclopenta [a] phenanthren-17-yl)pentanamido)propane-1-sulfonic acid (276 mg) was obtained after purification by column chromatography with a yield of 68.6%. ESI-MS (m/z): 1059.7 (2M+H)$^+$. $^1$HNMR (300 MHz, CD3OD): δ0.69 (s, 3H), 0.95 (s, 3H), 0.99 (d, 3H), 1.32 (d, 3H), 2.71 (s, 1H), 2.8-3.1 (qd, 2H), 3.79 (m, 2H), 4.34 (m, 1H).

Example 6: ((2S)-2-((4R)-4-((3R,6R,7S,10R,13R,17R)-3,6,7-trihydroxy-10,13-dimethylhexadecahydro-1H-cyclopenta[a]phenanthren-17-yl)pentanamido)propane-1-sulfonic acid)

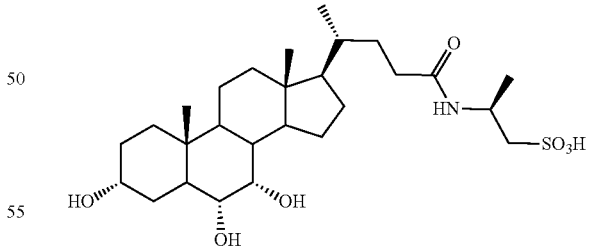

The procedure was the same as that in Example 5, except that (R)-2-aminopropanesulfonic acid was replaced with (S)-2-aminopropanesulfonic acid to obtain (2S)-2-((4R)-4-((3R,6R,7S,10R,13R,17R)-3,6,7-trihydroxy-10,13-dimethylhexadecahydro-1H-cyclopenta[a]phenanthren-17-yl)pentanamido)propane-1-sulfonic acid (292 mg) with a yield of 72.6%. ESI-MS (m/z): 1059.7 (2M+H)$^+$. $^1$HNMR (300 MHz, CD3OD): δ0.69 (s, 3H), 0.95 (s, 3H), 0.99 (d, 3H), 1.32 (d, 3H), 2.8-3.1 (qd, 2H), 3.79 (m, 2H), 4.37 (m, 1H).

Example 7: Synthesis of N-methyltauro hyocholic acid

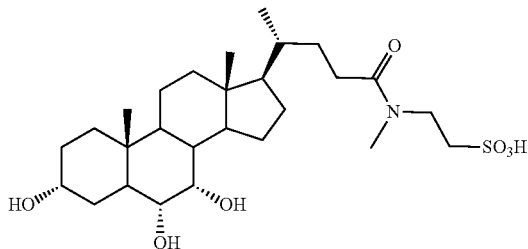 [SMILES: C[C@H](CCC(=O)N(C)CCS(=O)(=O)O)[C@H]1CCC2C3C(CC[C@@]21C)[C@@]1(C)CC[C@@H](O)CC1[C@@H](O)[C@H]3O]

The procedure was the same as that in Example 5, except that (R)-2-aminopropanesulfonic acid was replaced by N-methyltaurine to obtain N-methyltauro hyocholic acid (164 mg) with a yield of 40.8%. ESI-MS (m/z): 1059.7 (2M+H)$^+$. $^1$HNMR (300 MHz, CD3OD): δ0.69 (s, 3H), 0.93 (s, 3H), 0.99 (d, 3H), 1.3 (s, 3H), 2.70 (m, 1H), 2.93 (m, 1H), 2.95-3.12 (m, 2H), 3.13 (m, 1H), 3.76 (m, 4H).

Example 8: Synthesis of N-methylglycine hyocholic acid

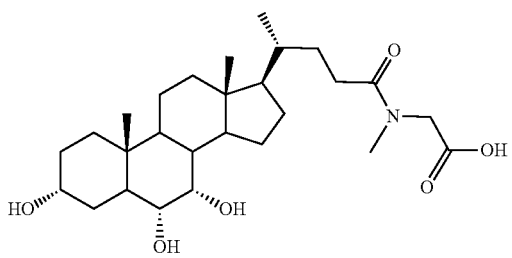 [SMILES: C[C@H](CCC(=O)N(C)CC(=O)O)[C@H]1CCC2C3C(CC[C@@]21C)[C@@]1(C)CC[C@@H](O)CC1[C@@H](O)[C@H]3O]

The preparation method includes the following steps:

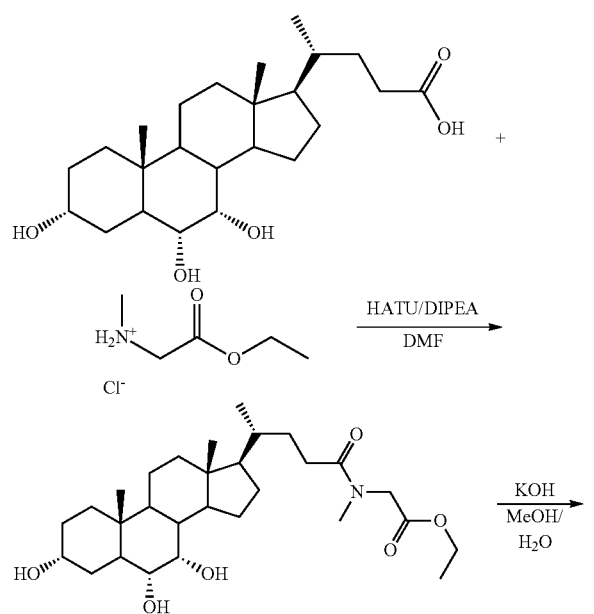

Hyocholic acid (0.31 g, 0.76 mmol), N-methylglycine ethyl ester hydrochloride (0.117 g, 0.8 mmol) and N,N-diisopropylethylamine (0.29 g, 2.28 mmol) were dissolved in dimethylformamide (5 ml) and stirred evenly. At room temperature, tetramethylurea hexafluorophosphate (0.32 g, 0.836 mmol) was added at one time and the reaction was carried out at this temperature for 1 h. After the completion of the reaction monitored by thin layer chromatography, water (10 ml) was added and the reaction solution was extracted twice with ethyl acetate. The organic phase was washed with 1N sodium hydroxide, 1N hydrochloric acid and saturated brine successively, and then the organic phase was dried and concentrated to obtain N-methylglycine hyocholic acid ethyl ester as the intermediate.

The intermediate was dissolved in 10 mL of methanol/water (4/1 v/v), potassium hydroxide (66 mg) was added, and subjected to hydrolysis at room temperature. After the reaction, the reaction solution was concentrated under reduced pressure to remove the methanol solvent. The residue was diluted with water (5 ml), and adjusted to pH=1-2 with 1N hydrochloric acid. The reaction solution was extracted twice with ethyl acetate, and the organic phases were combined, dried and concentrated to obtain N-methylglycine hyocholic acid (263 mg) with a yield of 72.2%. ESI-MS (m/z): 959.6 (2M+H)$^+$. $^1$HNMR (300 MHz, DMSO): δ0.6 (s, 3H), 0.83 (s, 3H), 0.88 (d, 3H), 1.31 (s, 3H), 3.13 (m, 1H), 3.59 (m, 2H), 3.89 (s, 1H), 4.19 (m, 1H), 4.32 (m, 1H).

Example 9: Synthesis of (S)-23-methylhyocholic acid

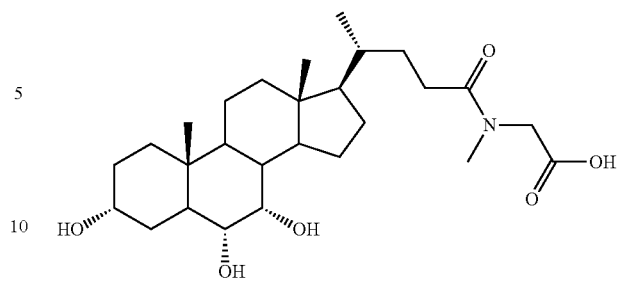

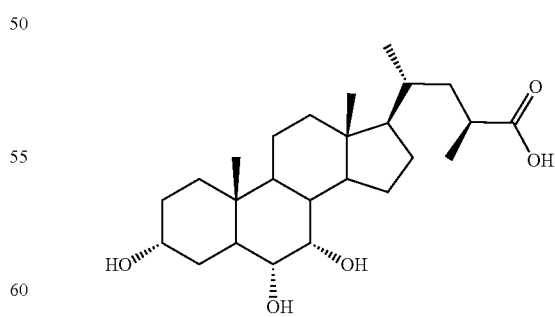

The preparation method includes the following steps:

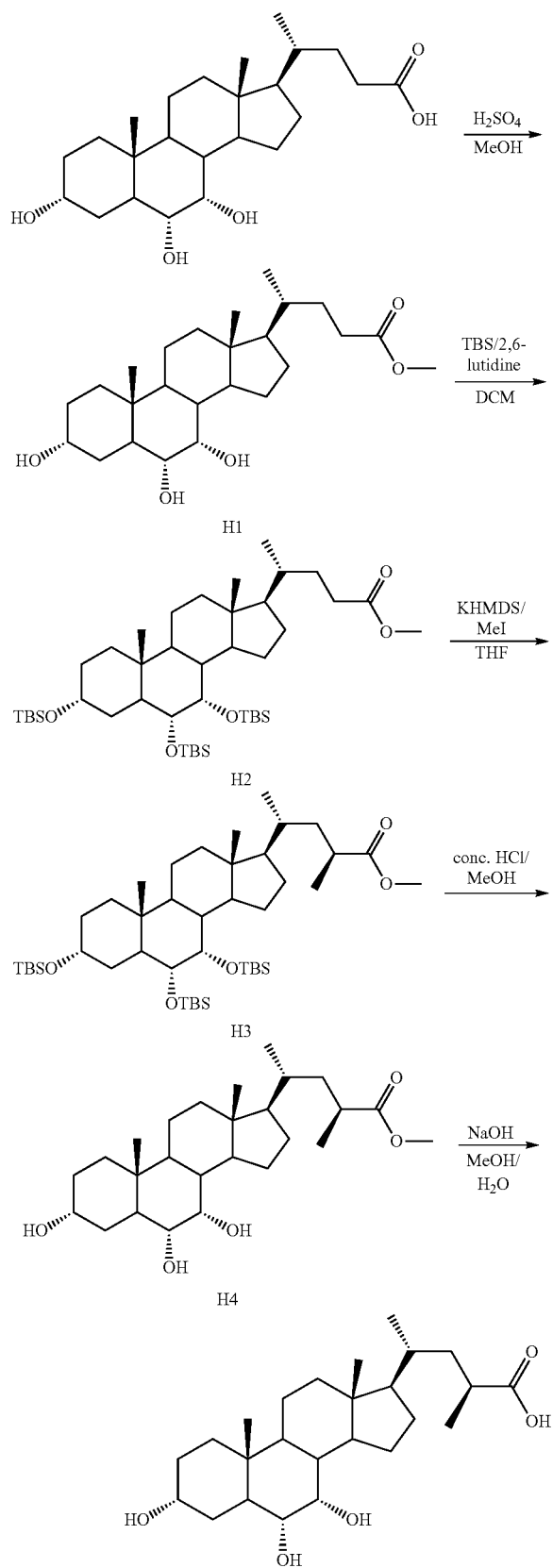

Hyocholic acid (1.632 g, 4 mmol) was dissolved in methanol (30 mL), and three drops of concentrated sulfuric acid were added thereto for catalyzation and the reaction was carried out overnight at room temperature. After the completion of the reaction monitored by thin layer chromatography, the reaction solution was concentrated under reduced pressure to remove the methanol solvent. The result was dissolved in ethyl acetate, and washed with saturated sodium bicarbonate and brine successively. The organic phase was dried and concentrated to obtain hyocholic acid methyl ester (H1) (1.69 g).

Hyocholic acid methyl ester (1.69 g, 4 mmol) and 2,6-lutidine (4.29 g, 40 mmol) were dissolved in dichloromethane, under nitrogen atmosphere, the reaction solution was cooled to 0-5° C., and tert-butyl dimethylsilyl trifluoromethanesulfonate (2.8 ml) was added to the reaction solution dropwise, and the reaction was carried out at room temperature. After the completion of the reaction monitored by thin layer chromatography, the reaction solution was subjected to flash column chromatography to obtain the intermediate (H2) (3.1 g).

The intermediate H2 and HMPA (4.35 g, 24 mmol) were added to anhydrous tetrahydrofuran, stirred evenly, and cooled to −78° C. under nitrogen atmosphere. After the reaction was carried out at this temperature for 30 min, methyl iodide (5.7 g, 40 mmol) was slowly added dropwise to the reaction solution, the reaction was then carried out at this temperature for 1 h. The temperature was then naturally raised to room temperature and the reaction was carried out overnight. After the completion of reaction monitored by thin layer chromatography, the reaction was quenched with saturated ammonium chloride solution. The reaction solution was extracted twice with ethyl acetate. The organic phases were combined and washed once with saturated brine. The organic phase was dried and concentrated to obtain a residue, which was purified by column chromatography to obtain intermediate (H3) (2.24 g), the yield of three steps was 71.8%.

The intermediate (H3) was dissolved in methanol (20 mL), 4 drops of concentrated hydrochloric acid was added thereto for catalyzation, and subjected to deprotection of the TBS protecting group at room temperature. After the reaction was completed, the reaction solution was concentrated under reduced pressure to remove the methanol solvent. The residue was dissolved in 10 mL of tetrahydrofuran/$H_2O$ (4:1), and sodium hydroxide (0.34 g, 8.6 mmol) was then added. The reaction was carried out at room temperature. After the completion of the hydrolysis, the reaction solution was extracted twice with ethyl acetate. The aqueous phase was adjusted to pH=1-2 with 1N hydrochloric acid, and extracted with ethyl acetate for three times. The organic phases were combined, dried and concentrated to obtain a mixture of (S)-23-methylhyocholic acid and (R)-23-methylhyocholic acid. The diastereomer was then subjection to resolution by column chromatography to obtain (S)-23-methylhyocholic acid (331 mg) with a two-step yield of 27.1%. ESI-MS (m/z): 959.6 (2M+H)$^+$. $^1$HNMR (300 MHz, CD$_3$OD): 0.68 (S, 3H), 0.93 (S, 3H), 0.98 (d, 3H), 1.12 (d, 3H), 2.57 (m, 1H), 3.58 (m, 1H), 3.78 (m, 2H).

Example 10: The Concentration of Hyocholic Acid Decreased Significantly in Patients with Fatty Liver Disease The experimental samples in the present disclosure were approved by the local ethics committee and informed consent was obtained from all subjects. A total of 200 subjects were enrolled in Example 1 of the present disclosure, and the content of cholic acid, amino acid and fatty acid and other metabolites in serum samples of 25 healthy patients confirmed by liver puncture and 175 patients with fatty liver (including simple fatty amine, steatohepatitis, steatohepatitis with early liver fibrosis, steatohepatitis with late liver fibrosis, and steatohepatitis with liver cirrhosis) confirmed by liver biopsy and corresponding clinical indicators were detected by ultra-high performance liquid chromatography tandem mass spectrometry. The results showed that hyocholic acid decreased significantly in patients with fatty liver disease (FIG. 1).

Example 11

Figure 2:
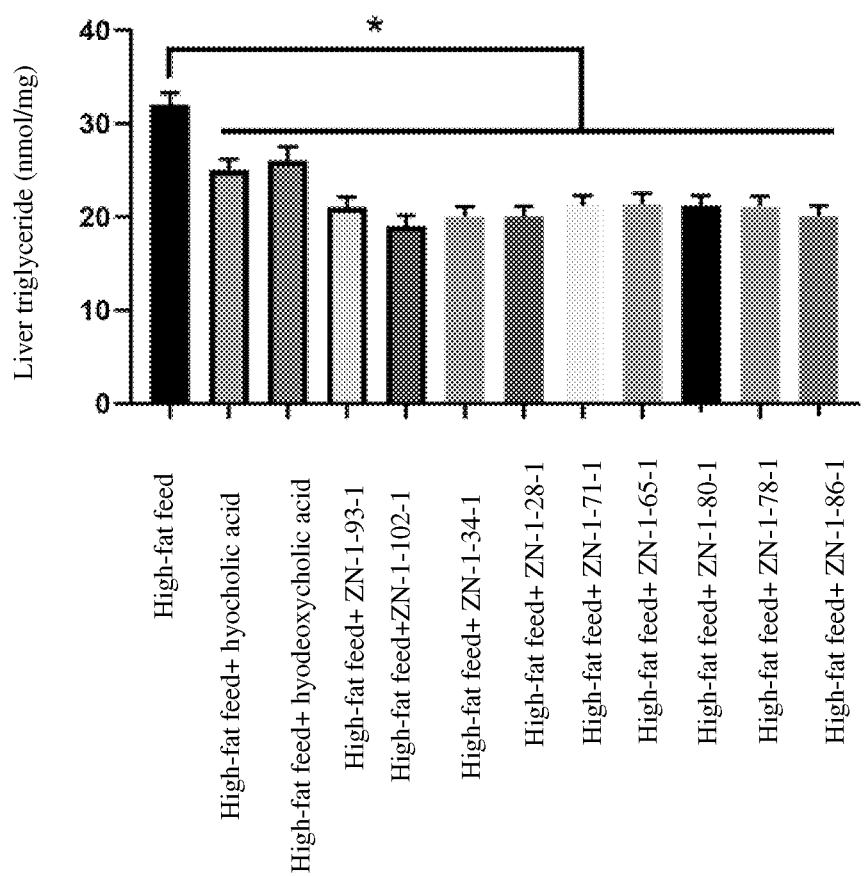
FIG. 2 is a graph showing the significant decrease of liver triglyceride after 8 weeks of intervention with hyocholic acid, hyodeoxycholic acid and 9 kinds of synthetic bile acid derivatives of the present disclosure.
Figure 3:
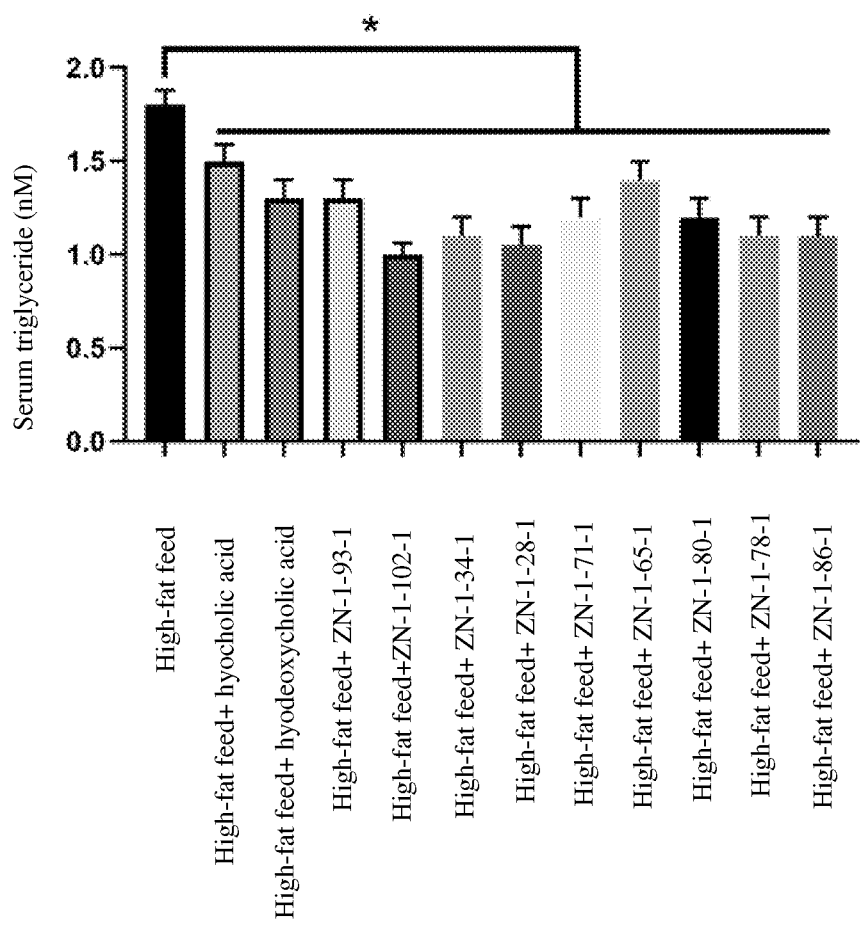
FIG. 3 is a graph showing the significant decrease of serum triglyceride after 8 weeks of intervention with hyocholic acid, hyodeoxycholic acid and 9 kinds of synthetic bile acid derivatives of the present disclosure.

As shown in FIG. 2 and FIG. 3, hyocholic acid, hyodeoxycholic acid, and synthetic hyocholic acid derivatives (Table 1) can significantly improve the serum hyperlipidemia induced by high fat in mice. In the fat-induced obesity mouse model, hyocholic acid and hyodeoxycholic acid were administered by gavage at a dose of 50 mg/kg/day while feeding high-fat diet (HFD) for 8 weeks. It was found that the triglyceride levels of mice in the groups fed with hyocholic acid, hyodeoxycholic acid and synthetic hyocholic acid derivatives were significantly lower than those in the simple high-fat diet group after 8 weeks. The increase of hyocholic acid and hyodeoxycholic acid in mice can effectively improve the dyslipidemia in mice caused by high fat.

Example 12

Figure 4:
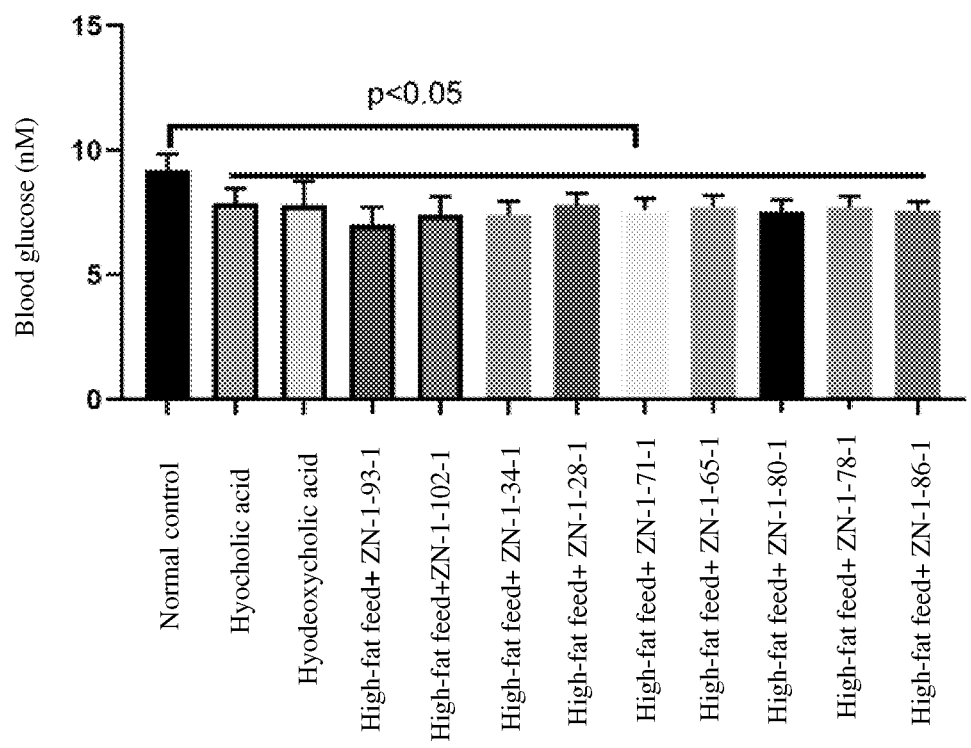
FIG. 4 shows the changes of blood glucose level in mice after 1 week of intervention of hyocholic acid (HCA), hyodeoxycholic acid (HDCA) and 9 kinds of synthetic bile acid derivatives (50 mg/kg).

Porcine bile acid series and synthetic hyocholic acid derivatives (50 mg/kg/day) were orally administered to C57BL/6J mice (Table 1). As shown in FIG. 4, after one week of intervention, the results showed that blood glucose was significantly decreased in all intervention groups.

Example 13

Figure 5:
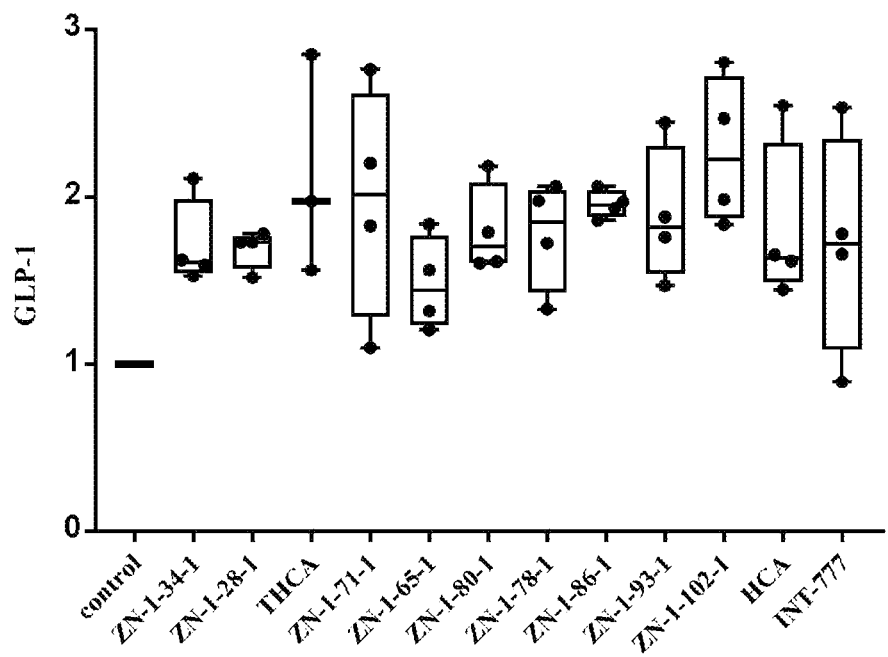
FIG. 5 shows that 50 µM bile acid and the derivatives thereof can effectively promote the secretion of GLP-1 in the enteroendocrine cell line NCI-H716 cells.

NCI-H716 cells were cultured and treated with 50 μM hyocholic acid and hyocholic acid derivatives, and a reported TGR5 agonist INT-777, and the levels of GLP-1 in the cell culture medium were measured. It was found that all compounds could effectively promote the release of GLP-1 (FIG. 5), and compound ZN-1-102-1 was superior to hyocholic acid and the existing TGR5 agonist INT-777 in the release of GLP-1.

Example 14

Figure 6A:
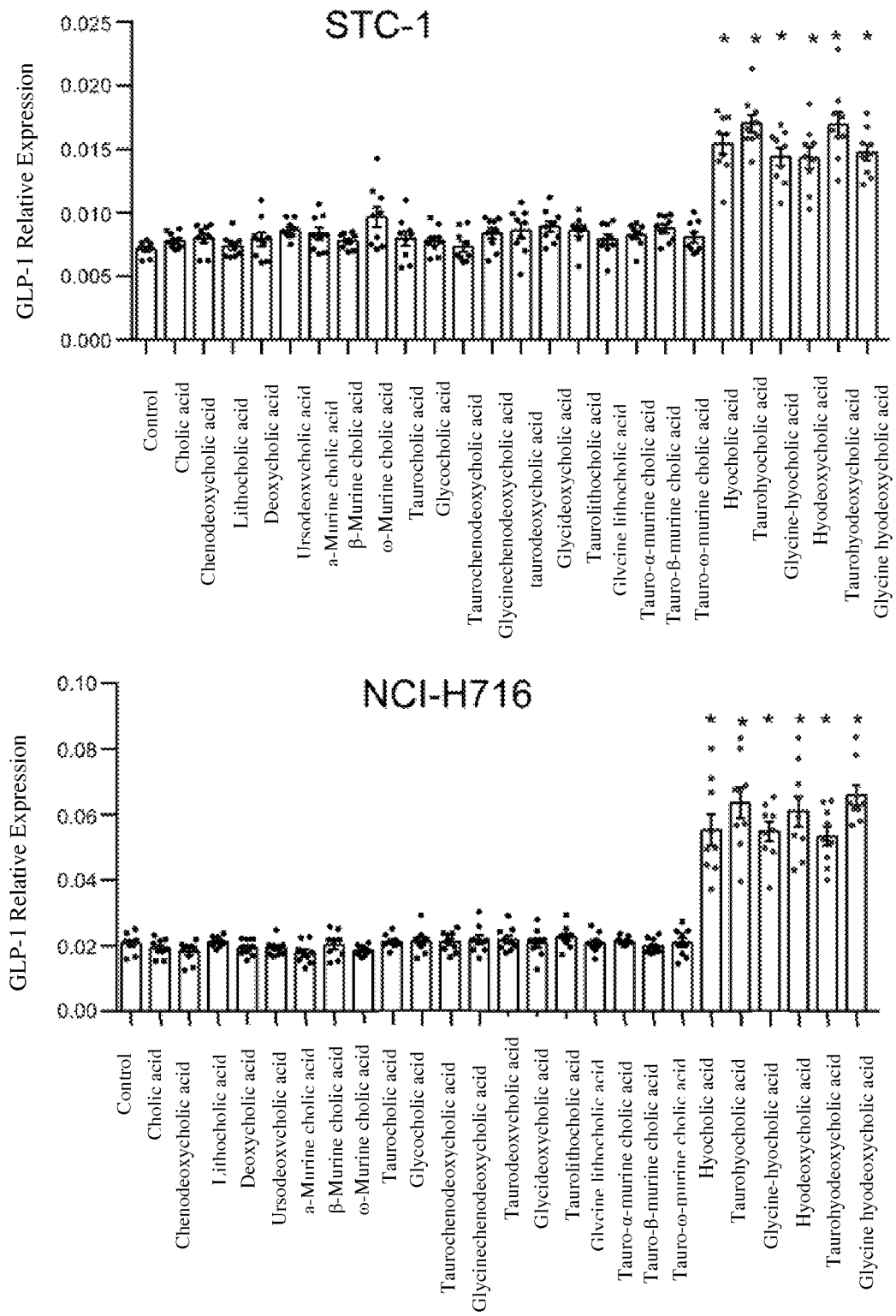
FIG. 6A, FIG. 6B, FIG. 6C, FIG. 6D, and FIG. 6E show that after NCI-H716 and STC-1 cells were treated with hyocholic acid and 6 kinds of bile acid derivatives and 19 kinds of other bile acid derivatives for 48 hours at 50 µM, it was found that hyocholic acid and the derivatives thereof were more effective in up-regulating GLP-1 protein expression in enteroendocrine cell line than other bile acids through the action of TGR5 and FXR.
Figure 6B:
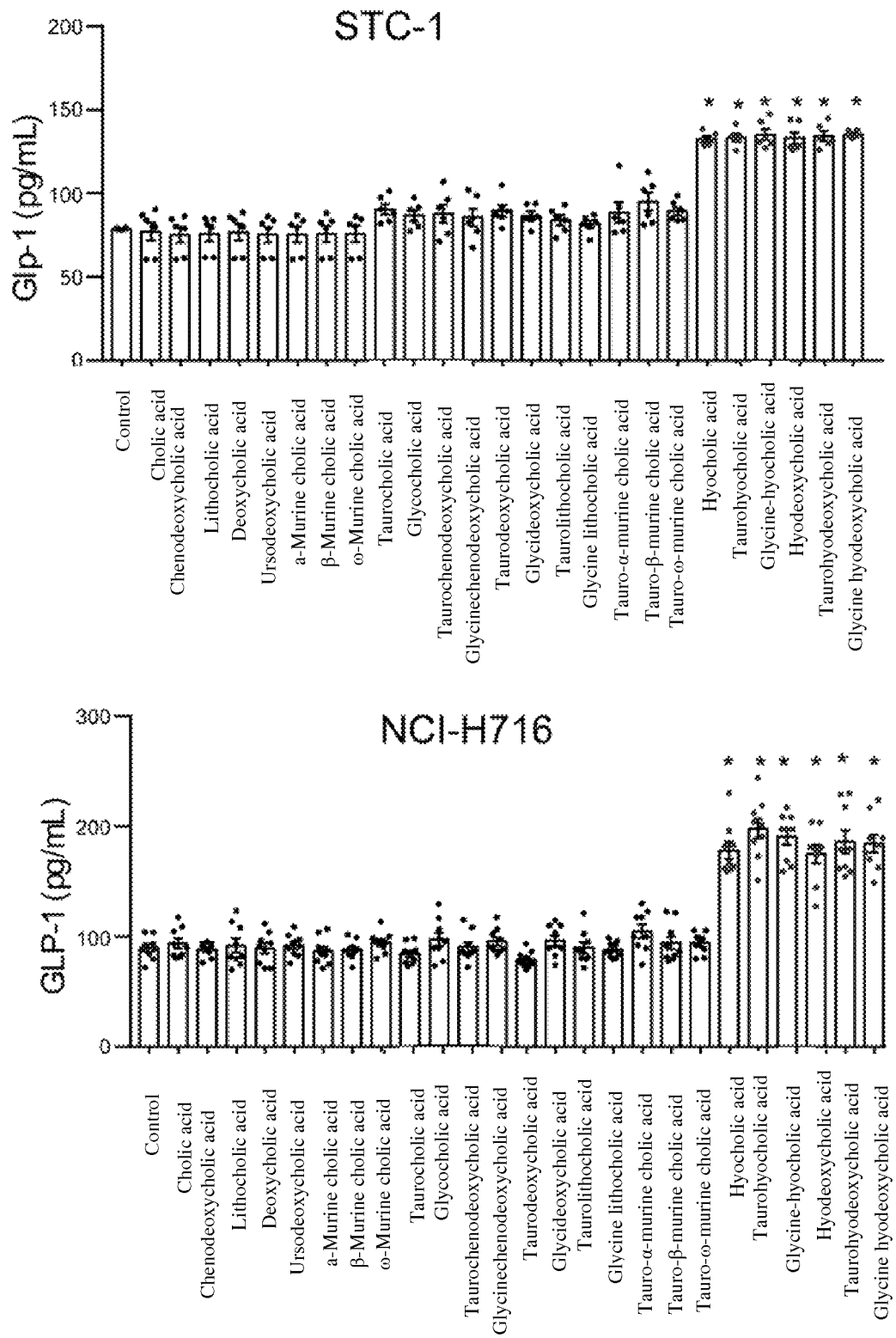
Figure 6C:
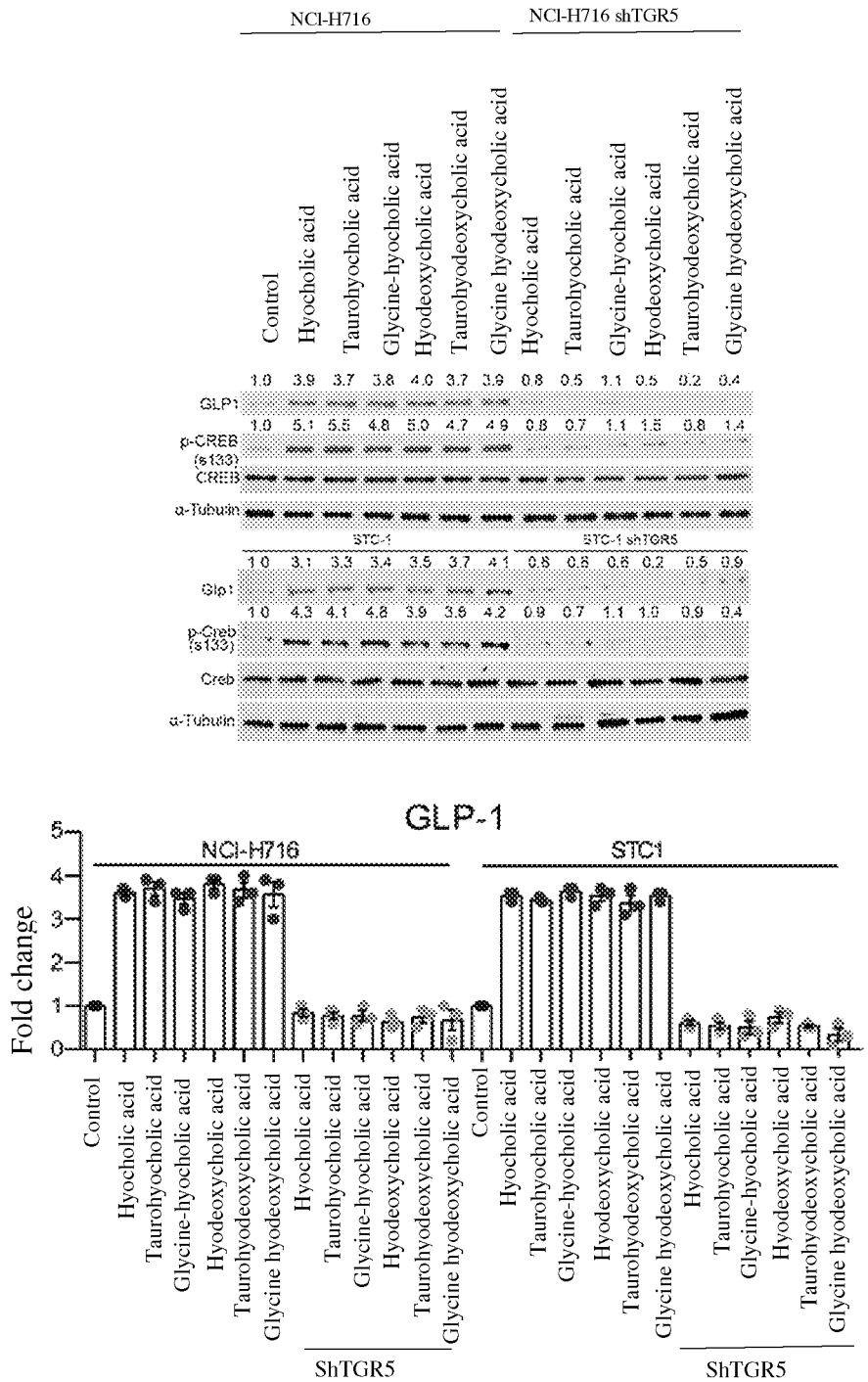
Figure 6D:
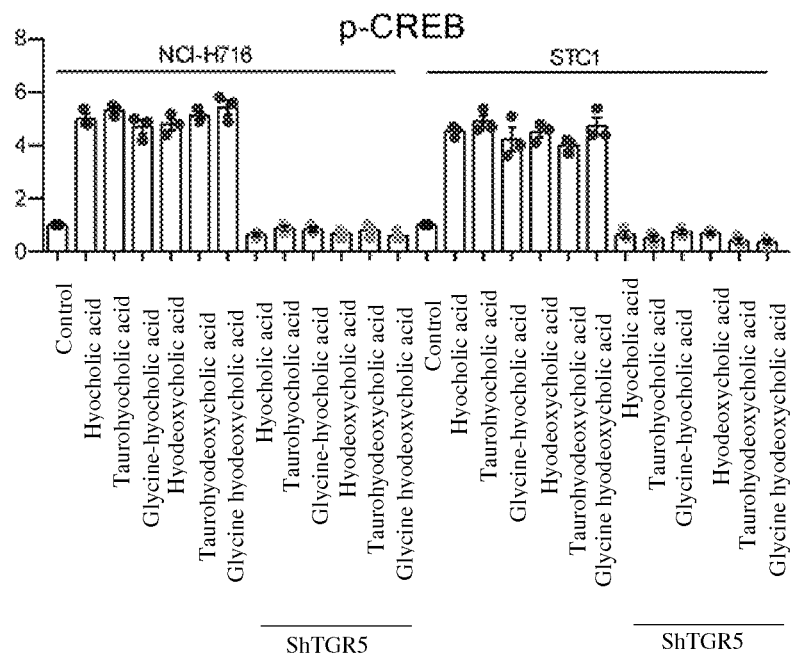
Figure 6E:
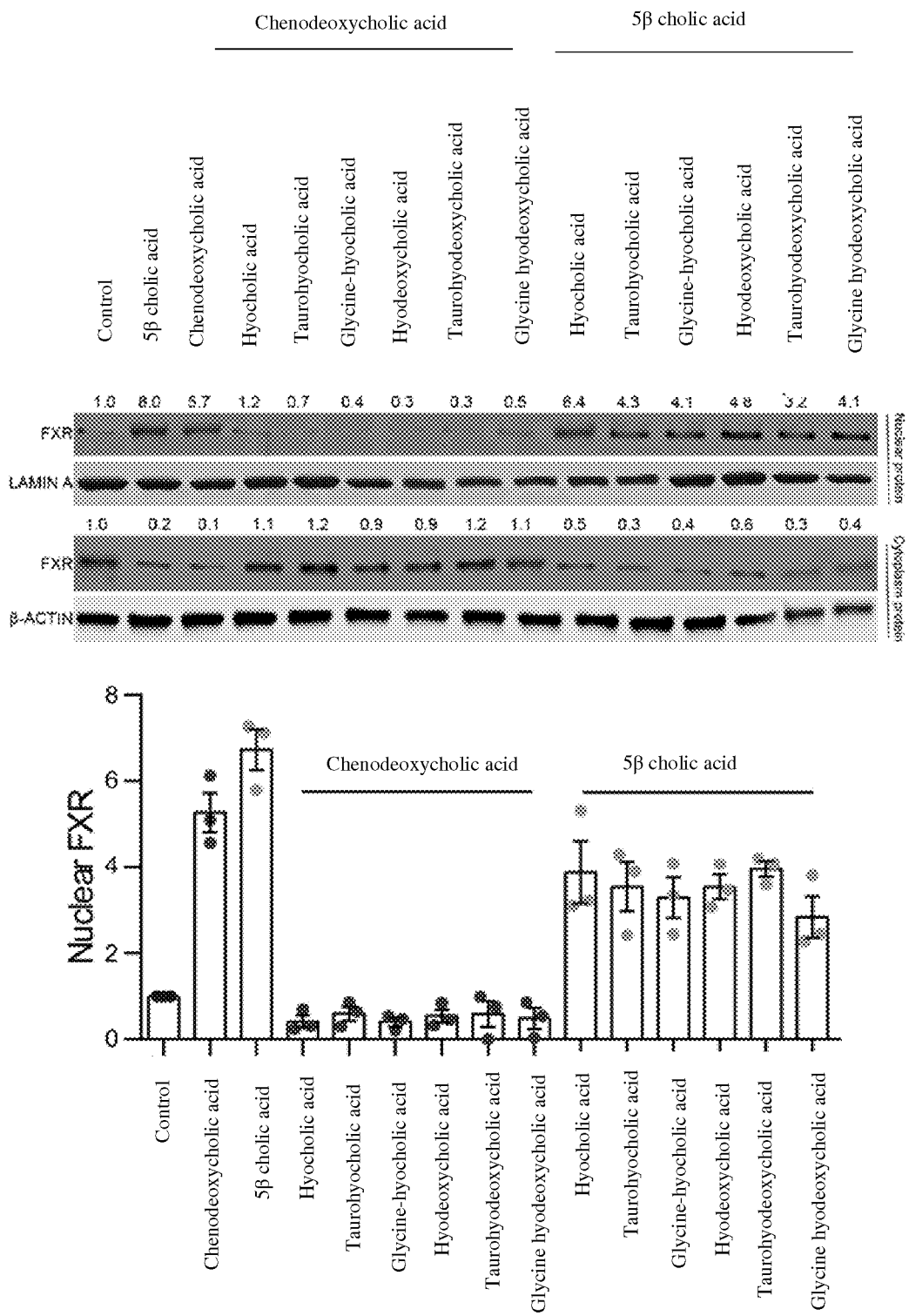

NCI-H716 and STC-1 cells were treated with 50 μM hyocholic acid, hyodeoxycholic acid, taurohyodeoxycholic acid, glycohyodeoxycholic acid, taurohyocholic acid, glycohyocholic acid and 19 kinds of other bile acids for 48 hours. It was found that hyocholic acid and the derivatives thereof were more effective than other bile acids in upregulating GLP-1 protein expression in enteroendocrine cell lines through the action of TGR5 and FXR (FIG. 6A, FIG. 6B, FIG. 6C, FIG. 6D, and FIG. 6E). (a) GLP-1 transcription was measured using real-time PCR, see FIG. 6A. (b) GLP-1 secretion was measured using ELISA, see FIG. 6B. (c) NCI-H716 and STC-1 and TGR5 knockdown cells thereof were treated with 6 kinds of hyocholic acids for 24 h and intracellular GLP-1, p-CREB and total CREB were measured using western blotting. See FIG. 6C and FIG. 6D. (d) FXR protein concentration in nuclear and cytoplasmic fractions ofNCI-H716 cells after 24 h treatment with 50 μM chenodeoxycholic acid or 5-cholic acid in the presence and absence of hyocholic acid. See FIG. 6E. * P<0.05, compared with the control.

It can be understood that for those skilled in the art, equivalent replacements or changes can be made according to the technical solutions and the inventive concept thereof of the present disclosure, and all these changes or replacements should belong to the protection scope of the appended claims of the present disclosure.

What is claimed is:

1. A bile acid derivative or a pharmaceutically acceptable salt thereof, wherein, the bile acid derivative is represented by the following formula,

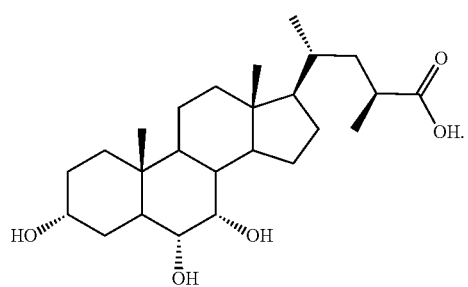 [SMILES: C[C@H](C[C@H](C)C(=O)O)[C@H]1CCC2C3C(CC[C@@]21C)[C@@]1(C)CC[C@@H](O)CC1[C@@H](O)[C@H]3O]

2. A composition comprising the bile acid derivative or the pharmaceutically acceptable salt thereof as defined in claim 1 and an acceptable carrier.

3. The composition as defined in claim 2, wherein, the acceptable carrier refers to a pharmaceutically acceptable excipient.

4. The composition as defined in claim 2, wherein, the composition is an oral preparation.

5. The composition as defined in claim 2, wherein, the composition is a tablet, granule, solution, capsule or suspension.

6. The composition as defined in claim 2, wherein, the composition is an enteric-coated preparation or an enteric-coated sustained-release preparation.

7. A composition for treating and ameliorating diseases and symptoms mediated or caused by FXR or TGR5, comprising the bile acid derivative or the pharmaceutically acceptable salt thereof as defined in claim 1 and an acceptable carrier, wherein, the diseases and symptoms mediated or caused by the FXR or TGR5 is selected from the following diseases or symptoms: liver disease, hyperlipidemia, hypercholesterolemia, obesity, metabolic syndrome, cardiovascular disease, gastrointestinal disease, atherosclerosis sclerosis and nephropathy.

8. The composition as defined in claim 7, wherein, the acceptable carrier refers to a pharmaceutically acceptable excipient.

9. The composition as defined in claim 7, wherein, the composition is an oral preparation.

10. The composition as defined in claim 7, wherein, the composition is a table, granule, solution, capsule or suspension.

11. The composition as defined in claim 7, wherein, the composition is an enteric-coated preparation or an enteric-coated sustained-release preparation.

12. The composition as defined in claim 7, wherein, the liver disease is selected from simple fatty liver, primary biliary cirrhosis, primary sclerosing cholangitis, liver fibrosis, liver cirrhosis, non-alcoholic steatohepatitis, non-alcoholic fatty liver disease and their associated liver injuries.

13. A therapeutic method of treating and ameliorating diseases and symptoms mediated or caused by FXR or TGR5, comprising administering an effective amount of the bile acid derivative or the pharmaceutically acceptable salt as defined in claim 1 to the patients having the diseases and symptoms, wherein the diseases and symptoms mediated or caused by FXR or TGR5 is selected from the following diseases or symptoms: liver disease, hyperlipidemia, hypercholesterolemia, obesity, metabolic syndrome, cardiovascular disease, gastrointestinal disease, atherosclerosis sclerosis and nephropathy.

14. The therapeutic method as defined in claim 13, wherein the dosage is a daily dose of 50-500 mg/kg of the patient's body weight.

15. The therapeutic method as defined in claim 13, wherein, the liver disease is selected from simple fatty liver, primary biliary cirrhosis, primary sclerosing cholangitis, liver fibrosis, liver cirrhosis, non-alcoholic steatohepatitis, non-alcoholic fatty liver disease and their associated liver injuries.

16. The therapeutic method as defined in claim 14, wherein, the bile acid derivative is administered to the patient in combination with hypoglycemic and lipid-lowering drugs, and the hypoglycemic and lipid-lowering drugs are selected from Liraglutide, Exenatide and Albiglutide.

17. The composition as defined in claim 2, wherein, the composition is a chewable tablet or dispersible tablet.

18. The composition as defined in claim 7, wherein, the composition is a chewable tablet or dispersible tablet.

* * * * *